(12) United States Patent
Hoffman et al.

(10) Patent No.: US 7,721,815 B2
(45) Date of Patent: May 25, 2010

(54) CUSHION STANDARD SHIELD SYSTEM

(75) Inventors: Mark P. Hoffman, Deer Creek, IL (US); Aaron Beyer, Roanoke, IL (US); Rickey Gerber, Roanoke, IL (US); Gaylen J. Kromminga, Morton, IL (US)

(73) Assignee: CNH America LLC, New Holland, PA (US)

( * ) Notice: Subject to any disclaimer, the term of this patent is extended or adjusted under 35 U.S.C. 154(b) by 30 days.

(21) Appl. No.: 11/742,236

(22) Filed: Apr. 30, 2007

(65) Prior Publication Data

US 2008/0264659 A1  Oct. 30, 2008

(51) Int. Cl.
*A01B 15/16* (2006.01)

(52) U.S. Cl. .................................. 172/558; 172/563

(58) Field of Classification Search ................. 172/558, 172/560, 561, 562, 563, 564, 565, 566
See application file for complete search history.

(56) References Cited

U.S. PATENT DOCUMENTS

| | | | | |
|---|---|---|---|---|
| 238,654 | A | * | 3/1881 | Corbin ........................ 172/558 |
| 625,320 | A | * | 5/1899 | Casaday ...................... 172/558 |
| 733,593 | A | | 7/1903 | Poirier |
| 736,369 | A | | 8/1903 | Dynes et al. |
| 744,711 | A | | 11/1903 | Bills |
| 747,759 | A | | 12/1903 | Packham |
| 787,016 | A | * | 4/1905 | Wimer ........................ 172/168 |
| 799,143 | A | | 9/1905 | Case |
| 928,088 | A | | 7/1909 | Voelkel |
| 989,748 | A | | 4/1911 | Adams |
| 1,018,220 | A | | 2/1912 | Van Brunt |
| 1,079,140 | A | | 11/1913 | Packham |
| 1,113,776 | A | | 10/1914 | Goetz |
| 1,142,185 | A | | 6/1915 | Lee |
| 1,148,390 | A | | 7/1915 | Lee |
| 1,367,736 | A | | 2/1921 | Dunham |
| 1,410,883 | A | * | 3/1922 | Bozard ........................ 172/560 |
| 1,545,895 | A | * | 7/1925 | Hamilton ..................... 172/561 |
| 1,568,897 | A | | 1/1926 | McKay |
| 1,723,705 | A | | 8/1929 | Packer |
| 1,837,347 | A | | 12/1931 | Vandine |
| 2,074,418 | A | * | 3/1937 | Opolo ......................... 172/536 |
| 2,155,739 | A | * | 4/1939 | Seaholm ...................... 172/558 |
| 2,524,330 | A | | 10/1950 | Rossi |
| 2,743,566 | A | | 5/1956 | Priestley |
| 3,045,765 | A | | 7/1962 | Cox et al. |

(Continued)

*Primary Examiner*—Thomas B Will
*Assistant Examiner*—Joel F Mitchell
(74) *Attorney, Agent, or Firm*—Rebecca L. Henkel; John William Stader (57) ABSTRACT

A cushion standard shield system to remove and deflect residue, dirt, debris, and soil from a cushion bearing hanger, or cushion standard, portion of a disk gang type agricultural implement is provided. The cushion standard shield system includes a mounting bracket supported by a common axle which carries multiple disk blades of the disk gang. A blade assembly is mounted to an upright portion of the mounting bracket, and is positioned generally behind and above the axle, behind the cushion standard. The blade assembly includes one or more plate member with arcuate lateral edges. The radii of the arcuate lateral edges correspond closely in magnitude to the radii of the concave and convex surfaces of the disk blades. The plate members are laterally adjustable with respect to each other, whereby the width dimension of blade assembly is variable to accommodate different axial spacing widths of adjacent disk blades.

10 Claims, 5 Drawing Sheets

U.S. PATENT DOCUMENTS

| | | | |
|---|---|---|---|
| 4,113,030 A | * | 9/1978 | Walker .................. 172/566 |
| 4,337,835 A | | 7/1982 | Steilen |
| 4,736,803 A | | 4/1988 | Roush |
| 4,858,699 A | * | 8/1989 | Poltrock ................ 172/558 |
| 5,042,590 A | * | 8/1991 | Bierl et al. ............. 172/572 |
| 5,060,586 A | | 10/1991 | Hoyt |
| 5,318,133 A | | 6/1994 | Logue |
| 5,678,500 A | | 10/1997 | Schmidt |
| 6,158,523 A | | 12/2000 | Gengler et al. |
| RE38,974 E | | 2/2006 | Gengler et al. |
| 2006/0225901 A1 | * | 10/2006 | Blunier et al. .......... 172/558 |

* cited by examiner

FIG. 1

CUSHION STANDARD SHIELD SYSTEM

FIELD OF THE INVENTION

The invention generally relates to a shield system for a disk configuration of an agricultural implement, and more specifically, to a cushion standard shield system that includes a blade assembly located proximate a cushion standard of an agricultural implement. The cushion standard shield system deflects soil, dirt, or debris, and prevents it from accumulating at the c-spring portions of cushion standards which support a disk blade gang.

BACKGROUND OF THE INVENTION

Agricultural soil preparation equipment typically includes a disk configuration, commonly referred to as a disk or disk harrow, to be used for breaking up and smoothing the surface of cultivated fields in preparation for planting. In addition to planting preparation, disk harrows are increasing in popularity as a necessary implement for crop residue management. Modem plant varieties produce relatively higher yields, are physically and structurally tougher, and leave behind relatively more residue than previously. The disk harrow is usually drawn by a tractor or other source of motor power; multiple disk gangs are often employed in a single disk harrow. In disk harrows which incorporate multiple disk gangs, a forward disk gang initially cuts residue or breaks up lumps and clods, and a rear disk gang reduces the residue of dirt fragments to a still smaller size and smoothes the ground. Accordingly, the residue is reduced in size and mixed with the dirt or soil, which increases its decomposition or breakdown rate.

Typical disk harrows include a main frame with several disk gang assemblies suspended therefrom. The disk gangs are generally mounted at an angle with respect to the forward direction of travel. Each of the disk gangs includes a plurality of equally spaced disk blades mounted on an axle for rotation about a common axis. The axle is supported by a series of C-shaped spring elements, i.e. cushion standards, configured to allow the disk gangs to flex with the contour of the landscape as the agricultural implement is drawn by the tow vehicle. In addition to providing articulation to accommodate terrain variations, the cushion standards serve a protective function for the implement. In particular, the cushion standards absorb energy associated with various shock loads, impacts, collisions and other harsh occurrences, which occur, e.g., when the implement encounters rocks or other obstructions during use.

In wet weather or in heavy, sticky soil conditions, earth tends to cling to the disk blades. In order to smooth the ground properly, it is desirable that this earth be removed frequently or even continuously. Otherwise, the accumulation of soil and residue adhering to the disks can adversely affect disk operation. To eliminate the accumulation of soil and residue, scraper devices have been developed to keep the surfaces of the disks, near their circumferences, clear of the soil and residue.

U.S. Pat. No. 4,127,179 discloses a scraper mechanism for a disk gang harrow. The scraper mechanism includes a scraper blade supported from a mounting bracket fixedly attached to a toolbar of an agricultural implement to be towed. The scraper blade is generally aligned in a downward direction so as to bias against the disk blade. An axle of the disk gang passes through bearing assemblies which are suspended and supported by bearing-support arms that extend down from the toolbar. The scraper blades are rigidly supported to the toolbar and likewise tend to bounce in relation to the disk gang. Also, the vertically aligned scraper blades tend to yield and break from miscellaneous forces (e.g., contact with debris flow caused by cutting action of the disk blade) associated with operation in the field. When the mounting bracket or fastener breaks, the scraper arm and attached scraper blade are usually lost in the field. Also, soil and residue flow tend to be carried from the rear of the rotating blades to up and forward over the top of the disk gang spools and be trapped behind the disk gang cushion standard and on the top of the gang bearing assembly. When this happens, the soil and residue mixture can be compacted between the disk blades and the cushion standard and prevent the proper operation of the disk gang.

As shown and described in copending and commonly assigned U.S. application Ser. No. 11/096,400, filed on Apr. 01, 2005 and published on Oct. 12, 2006 as U.S. publication number 2006/0225901, other, more desirable, disk scraping configurations have been developed. The scraper system includes scraper blades which are mounted to a bracket which is, in turn, mounted to the disk gang axle. Deflector plates are fixedly mounted at the cushion standards.

SUMMARY OF THE INVENTION

There is a need for a cushion standard shield system that is operable to prevent soil from being carried up and forward over the top of the disk gang bearings and packing against or otherwise collecting at the cushion standards. There is also a need for a cushion standard shield system that is highly adjustable, for example, width and/or height adjustable, to enable its use with various different disk blades and disk gangs.

The present invention provides a cushion standard shield system that meets the desires and needs described above. In a first embodiment of the present invention, a cushion standard shield system to remove and deflect dirt, debris, and soil from a cushion standard portion of a disk gang type agricultural implement is provided. The cushion standard shield system, in accordance with the present invention, includes a mounting bracket supported at an axle, in particular at a bearing assembly which concentrically supports the axle that carries multiple disk blades in the disk gang.

It is contemplated for the cushion standard shield system to include first and second plate members, each of which has arcuate lateral edges. The first and second plate members are attached to the mounting bracket in a manner which enables their lateral adjustment with respect to each other.

It is further contemplated for the cushion standard shield system to include a plate member which extends between a pair of adjacent disk blades, each of which has opposing concave and convex surfaces. The plate member has arcuate lateral edges, namely, a concave lateral edge and a convex lateral edge. The convex lateral edge of the plate member is proximate the concave surface of one disk blade, and the concave lateral edge of the plate member is proximate the convex surface of the other disk blade, whereby the plate member is laterally nested between the disk blades.

In a further embodiment, the cushion standard shield includes a plate member which is attached to a mounting bracket in a generally upright orientation or position. The plate member extends downwardly from the mounting bracket, beyond the upper surface of the bearing assembly, such that a lower edge of the plate member is positioned relatively lower than the upper surface of the bearing assembly.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
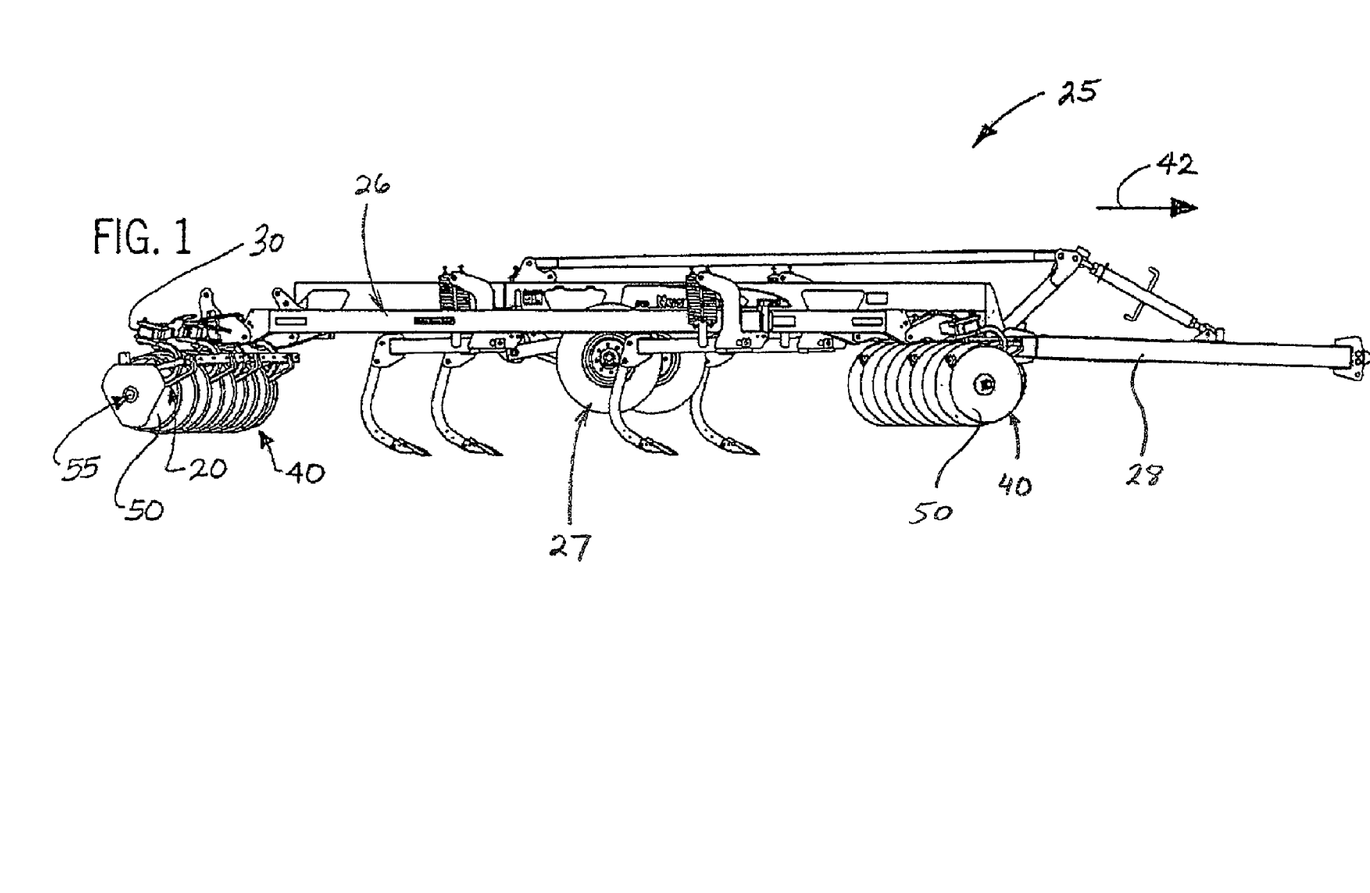
FIG. 1 illustrates a side elevation of an agricultural implement having disk gangs which include a first embodiment of a cushion standard shield system in accordance with the present invention.

FIG. 1 shows a preferred embodiment of a cushion standard shield system 20 employed on an agricultural tillage or soil-working implement 25. The agricultural implement 25 includes a tube or toolbar 30 in support of one or more disk gangs 40 operable to cut residue or break up lumps, clods and/or soil into smaller sized fragments and for residue management or smoothing the ground.

Figures 4, 5:
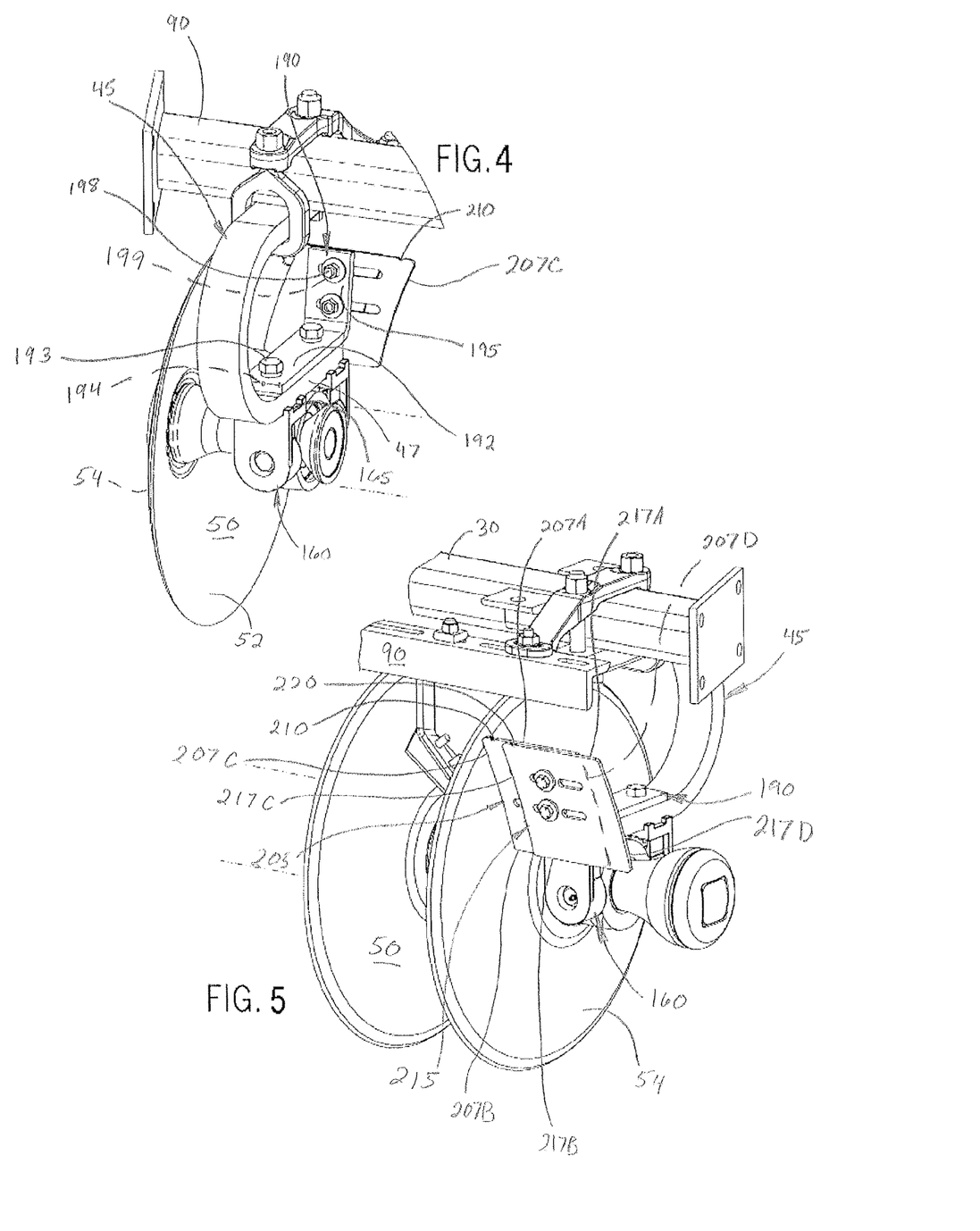
FIG. 4 illustrates a detailed forward perspective view of the cushion standard shield system and the disk gang shown in FIG. 1 wherein the end disk blade is removed.
FIG. 5 illustrates a detailed rearward perspective view of the cushion standard shield system and the disk gang shown in FIG. 1 wherein the end disk blade is removed.

The illustrated agricultural implement 25 is commonly referred to as a disk harrow or disk implement. This implement 25 includes frame 26 that supports running gear 27 is pulled from tongue 28. One or more conventional disk gangs 40 are attache to frame 26, at the front and rear of the implement 25. Preferred implements 25 include various ones manufactured by CNH America LLC, such as the Case IH models RMX340 and RMX370 Tandem Disks; New Holland models ST440 and ST460 Tandem Disks, optionally Case IH model MRX690, or New Holland model ST740, Ripper Disks, as illustrated. The one or more disk gangs 40 are supported from the toolbar 30 so as to be towed in a forward direction (illustrated by the arrow and reference 42) over the soil where crop residue is present. The implement 25 further includes a series of spring or cushion-typed bearing hangers, namely, cushion standards 45, which are configured in a conventional manner to resiliently support the disk gang 40 from the toolbar 30. The cushion standards 45 include a C-shaped spring elements (FIGS. 4 and 5) and generally planar bottom portions 47 (FIG. 4).

Figure 2:
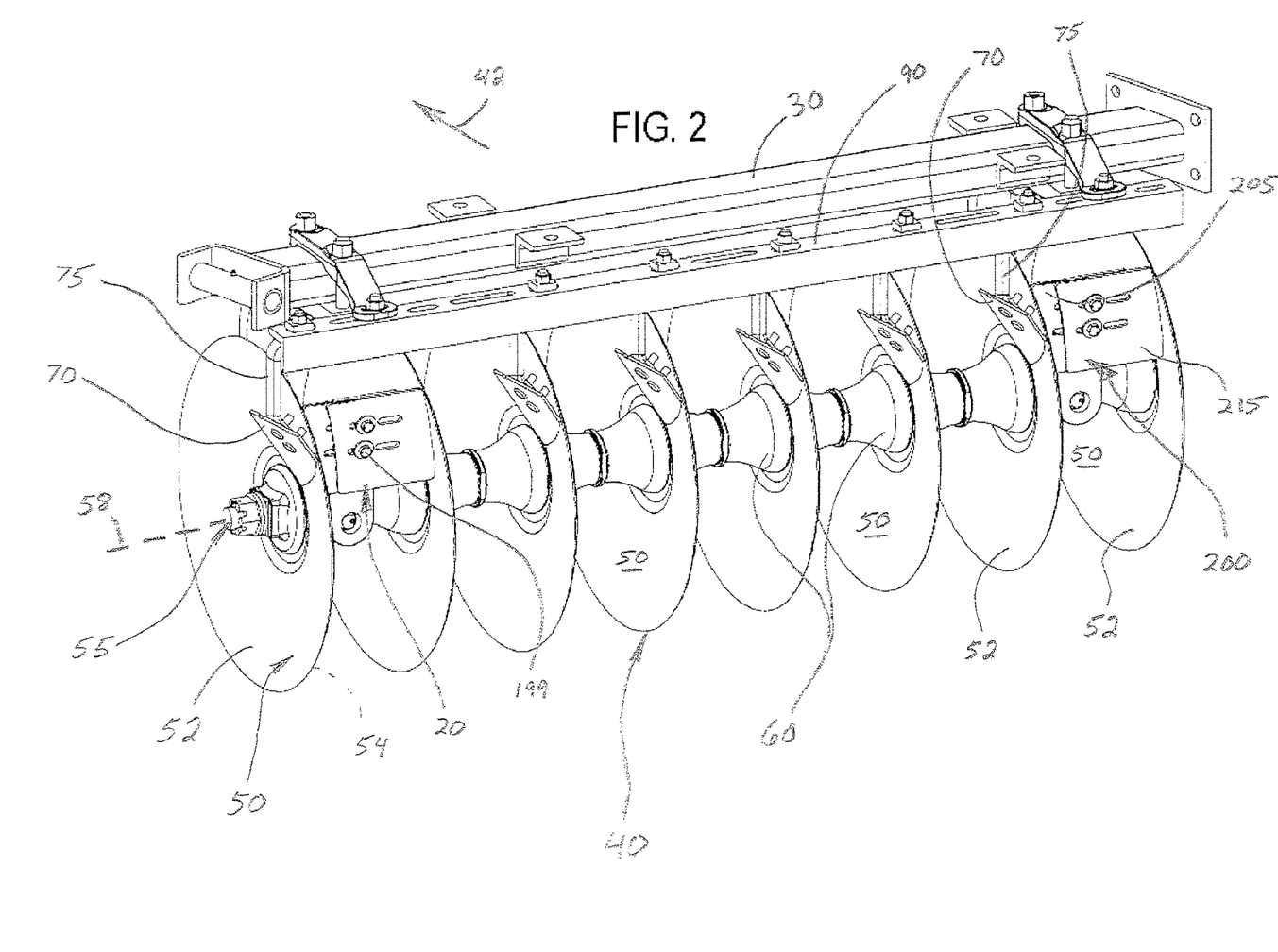
FIG. 2 illustrates a detailed rearward perspective view of the cushion standard shield system and the disk gang shown in FIG. 1.

Referring to FIG. 2, the preferred disk gang 40 generally includes a series of transversely spaced disk blades 50 mounted for rotation in unison on a common axle 55 extending generally parallel to the toolbar 30. The common axle 55 is defined by axis 58. The series of disk blades 50 are slidably spaced apart from one another by conventional sleeves or spools 60 along the common axle 55. The spools 60 in combination with conventional bearing assemblies 160 (FIG. 4) rotatably support the disk gang 40 on the common axle 55. As the toolbar 30 and disk gang 40 are moved in the forward direction through the soil, the disk gang 40 is operable in a conventional manner to break-up lumps and clods of soil and debris, to reduce fragments to still smaller-size, and to smooth the soil surface in, e.g., preparation for planting or residue management.

During use, dirt and debris tend to build up on the surfaces of the disk gang 40 between the individual disk blades 50. This dirt and debris must be removed to maintain good operation of the disk gang 40 in properly working the soil. Dirt and debris accumulates in different ways at various portions of the disk gang 40, whereby multiple methods are preferably used to suitably remove or prevent accumulating dirt and debris at different locations on the gang 40.

As one example, between most adjacent pairs of disk blades 50 along the length of axle 55, accumulating dirt and debris is adequately removed by various scraper blades 70. Each of the blades 70 is supported by an aim member 75 which is attached to the toolbar 30 or to a mounting bracket 90 that extends generally parallel to the axle 55. The arm member 75 includes a linear elongated metallic piece comprised of spring steel or other appropriate material operable to bias the scraper blade 70 against the surface of the disk blade 50.

The scraper blade 70 is generally mounted at an angle to effect a scraping action on the concave sides or concave surfaces 52 of the disk blade 50 in a conventional manner. The location of the scraper blade 70 relative to the respective disk blade 50 is generally identical for each of the series of disk blades 50 of the disk gang 40.

Referring specifically to FIG. 2, the scraper arm member 75 is configured to support and bias the scraper blade 70 against concave surface 52 of the disk blade 50. This alignment of the scraper arm member 75 holds the scraper blade 70 above the spool 60 in a manner that enhances removal of soil and debris attached to the disk blade 50. This alignment and location of the scraper a-in member 75 also places the scraper blade 70 above the spool 60 at a location out of the primary soil flow path, minimizing the potential for damage to the scraper arm member 75 and the scraper blade 70. The preferred scraper arm member 75 generally includes a linear elongated metallic piece comprised of spring steel or other appropriate material operable to maintain a bias of the scraper blade 70 against the disk blade 50.

While scraper blades 70 are adequate for removing or preventing accumulating dirt and debris at some portion of disk gang 40, they prove relatively less effective at other locations upon the disk gang 40. Namely, since scraper blades 70 are angularly mounted, they tend to deflect the dirt and debris axially away from the surfaces of the disk blades 50. The deflected dirt and debris correspondingly flow between the adjacent disk blades 50.

Figure 3:
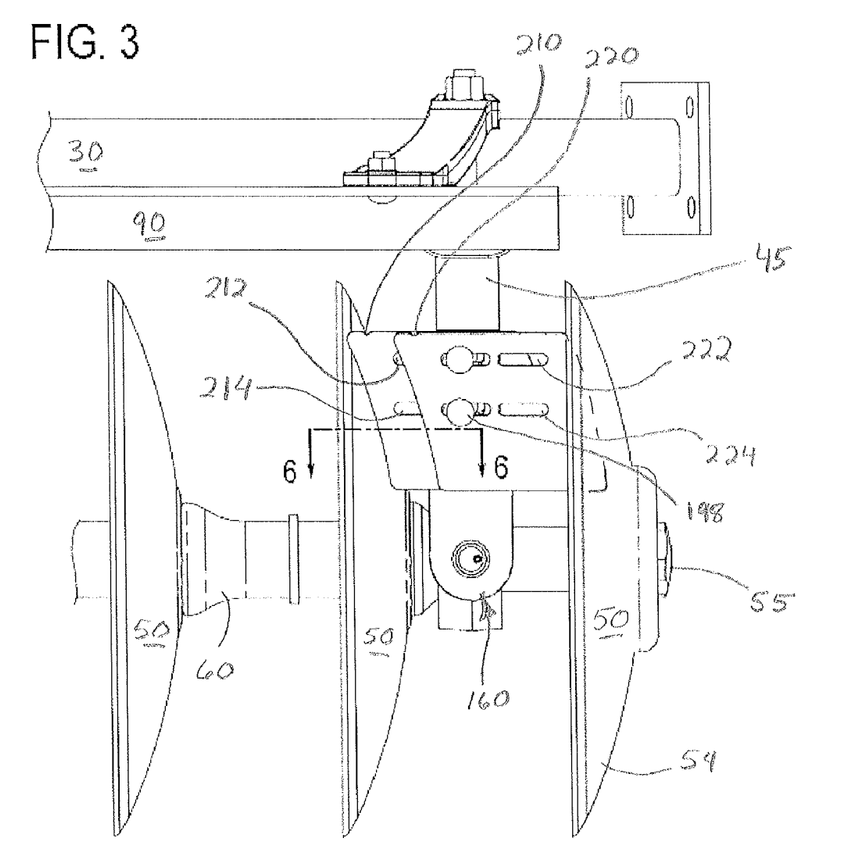
FIG. 3 illustrates a rear elevation of the cushion standard shield system, and a portion of the disk gang, shown in FIG. 1.

However, some disk blades 50 have intervening structure(s) between them, such as the cushion standards 45, FIG. 3. Accordingly, dirt and debris can accumulate at the cushion standards 45, despite the utilization of scraper blades 70. To prevent or mitigate this, cushion standard shield system 20 is provided. Cushion standard shield systems 20 can be used in addition to or in lieu of scraper blades 70 at or near, for example, cushion standards 45 of the disk gang 40.

Figure 6:
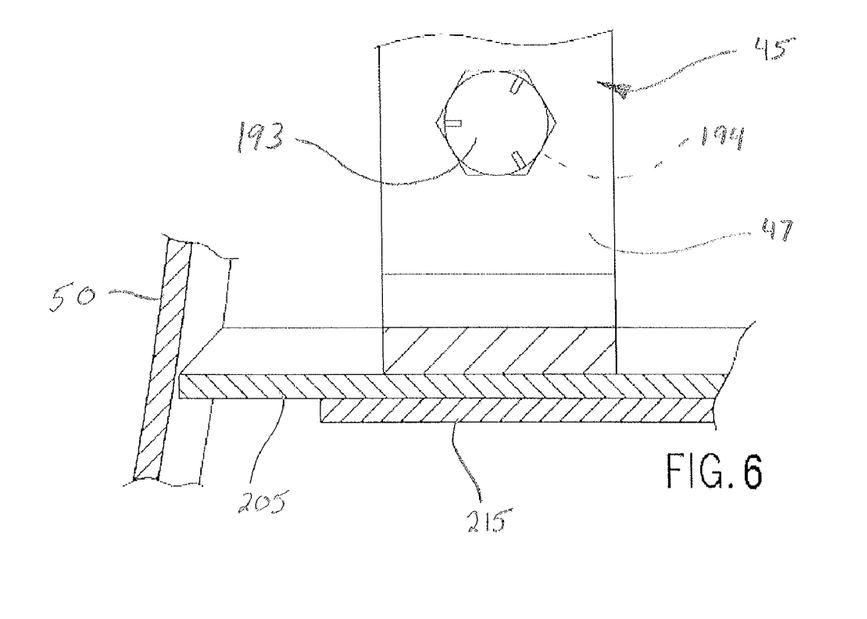
FIG. 6 illustrates a cross-section view of parts of the cushion standard shield system and a disk blade, taken at line 6-6 in FIG. 3.
Figures 7, 8:
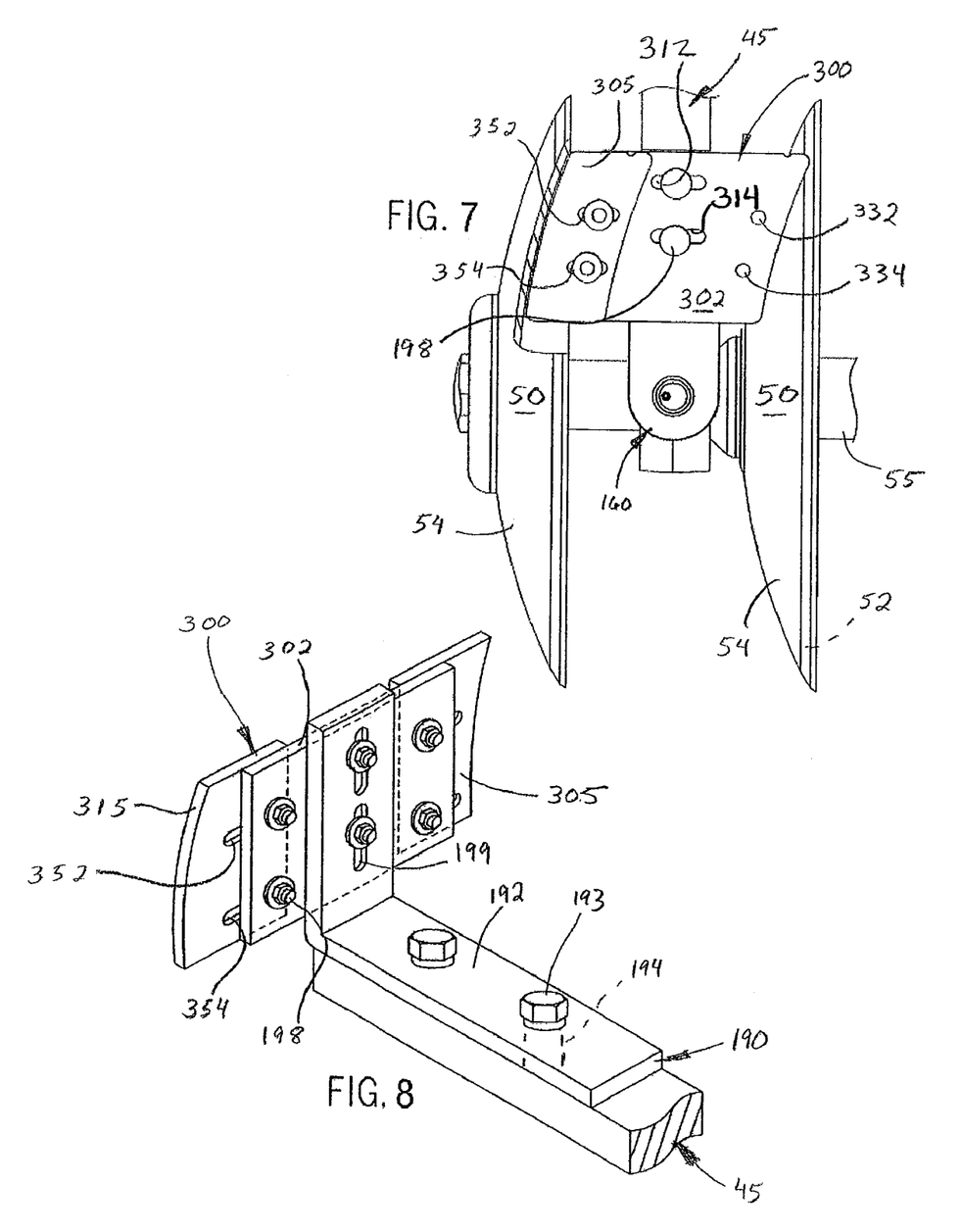
FIG. 7 illustrates a front elevation of a second embodiment of a cushion standard shield system in accordance with the present invention.
FIG. 8 illustrates a rearward elevation of a variant of the cushion standard shield system of FIG. 7.

Referring now to FIGS. 2-8, cushion standard shield system 20 includes, e.g., mounting bracket 190 and blade assembly 200 or 300 (FIGS. 7-8). The mounting bracket 190 includes an elongate, planar, horizontal leg portion 192. The lower surface of horizontal leg portion 192 interfaces with an upper horizontal flange or planar surface 165 (FIG. 4) of bearing assembly 160. Fasteners 193 extend through respective apertures or throughbores 194 of horizontal leg portion 192, and secure the mounting bracket 190 to the bearing assembly 160. The mounting bracket 190 further includes bracket upright 195, which extends upwardly from the end of horizontal leg portion 192 that is distal the C-shaped spring element of cushion standard 45. Various fasteners 198 extend through apertures 199 in blade assembly 200, 300 so as to suitably connect the mounting bracket 190 to the blade assembly 200, 300.

Regardless, the mounting bracket 190 is adapted and configured so that the cushion standard shield system 20 does not interfere with normal use of the implement 25. In other words, by way of the mounting brackets 190, the blade assemblies 200, 300 are positioned and oriented, e.g., above and rearward of the axle 55. The blade assemblies 200 and 300 are either perpendicular or angled with respect to the ground, as desired. In any event, the cushion standard shield system 20 is adapted and configured for suitable clearance between it and the underlying soil surface during. Such configuration mitigates the likelihood of non-desired contact(s) between, for example, the mounting bracket 190 or the blade assemblies 200, 300 and the ground.

Referring specifically to FIGS. 2-6, each blade assembly 200 includes, for example, first and second plate members 205 and 215, respectively. Referring to FIG. 3, plate member 205 has opposing front and back surfaces. At least one elongate aperture, namely, upper slot 212 extends through the entire thickness dimension of plate member 205, between the front and back surfaces. The upper slot 212 is preferably horizontal and is at an upper portion of the plate member 205. Preferably, the plate member 205 also includes a lower elongate slot 214. The lower slot 214 is located below the upper slot 212 and is, e.g., at a middle or lower portion of the plate member 205. Regardless of the exact location, the lower slot(s) 214 are preferably located low enough on the plate member 205, so that the plate member 205 extends downwardly from the mounting bracket 190, beyond the upper surface 165 of bearing assembly 160.

Referring specifically to FIGS. 3 and 5, upper edge 207A defines the uppermost segment of plate member 205 and includes, and preferably has, at least one alignment notch 210 extending thereinto. The alignment notch 210 serves as a reference point for, e.g., a predetermined blade assembly 200 width dimension. Optionally, the plate 205 or other components of blade assembly 200 includes various other indicia, in lieu of or in addition to notch 210, suitable for facilitating width setup of the device.

The plate member 205 further includes first and second generally parallel arcuate lateral edges 207C and 207D extending between and connecting the ends of upper and lower edges 207A, 207B. Of the arcuate lateral edges 207C, 207D, lateral edge 207C defines a concave segment of the perimeter of plate member 205, whilst lateral edge 207D defines a convex segment of the plate perimeter.

The radius of the concave arcuate later edge 207C corresponds closely in magnitude to the radius of the convex surface 54 of disk blade 50. Likewise, the radius of the convex arcuate lateral edge 207D corresponds closely in magnitude to the radius of the concave surface 52 of disk blade 50.

As illustrated in FIGS. 3-5, plate member 215 is substantially identical to plate member 205. In such embodiment, plate member 215 has front and back surfaces, and upper and lower edges 217A, 217B, respectively. At least one alignment notch 220 extends into the upper edge 217A. Lateral edges 217C and 217D extend between and connect the ends of the upper and lower edges 217A, 217B. Lateral edge 217C is concave and corresponds in radius, shape, and configuration to the convex surface 54 of disk blade 50. The other lateral edge 217D is convex and corresponds in radius, shape, and configuration to the concave surface 52 of disk blade 50. In addition, the second plate member 215 includes at least one upper slot 222 and at least one lower 224, which extend through the plate member 215 (FIG. 3).

Since plate members 205 and 215 are substantially identical in shape, perimeter, and other configurations, the two components are substantially interchangeable. Correspondingly, the blade assembly 200 is largely modular in design. Therefore, if, for example, a lateral edge 207C or 207D is damaged, the plate members 205 and 215 can be interchanged so that the respective lateral edge 217C or 217D replaces its orientation.

Referring now to FIGS. 3, 5, and 6, in the entire assemblage of blade assembly 200, plate members 205 and 215 are at least partially stacked and overlapping. For example, the back surface of plate member 205 interfaces the front surface of the mounting bracket upright 195 of mounting bracket 190. The front surface of plate member 205 slidingly interfaces with the back surface of the second plate member 215.

The stacked or overlapping plate members 205, 215 are arranged so that the respective upper slots 212 and 222 are aligned with each other and the lower slots 214 and 224 are aligned with each other. In this arrangement, the relative width dimension(s) of the entire blade assembly 200 can be adjusted as desired. In other words, the fasteners 198 can be loosened to permit the plate members 205, 215 to laterally advance toward or regress from each other, which reduces or increases the magnitude of the width dimension of blade assembly 200, respectively.

It can be appreciated that the minimum width dimension of blade assembly 200 is realized when, e.g., the plate member 215 completely overlies and covers plate member 205. The maximum width dimension of blade assembly 200 corresponds to (i) the width dimensions of the individual plate members 205, 215, (ii) the lengths of the elongate slots 212, 214, 222, and 224, and (iii) the lateral placement or location of the slots 212, 214, 222, and 224 along the widths of the respective plate members 205, 215. Regardless, the blade assembly 200 is adapted and configured to be adjustable so as to enable its use with different disk blades having different diameters, as well as, those with different radii of concavity and convexity.

Preferably, the blade assembly 200 is adjustable not only laterally, but also vertically, or otherwise. One exemplary structure for providing vertical adjustability is the mounting bracket 190 illustrated in FIG. 8. This embodiment of mounting bracket 190 includes vertically oriented elongate slots as apertures 199. Such configuration enables the entire blade assembly 200, 300 to be, e.g., slidingly moved upwardly from or downwardly toward the horizontal leg portion 192 of mounting bracket 190, as desired.

Referring to FIGS. 7 and 8, alternative embodiments of the shields assemblies, namely blade assemblies 300, include some components which are dissimilar from other. Thus, each blade assembly 300 includes a base plate 302 with is attached directly to the mounting bracket 190. In some embodiments, the base plate 302 has straight-line lateral edges (FIG. 8) while in the alternative the base plate 302 has generally arcuate lateral edges (FIG. 7).

The base plates 302 have horizontally oriented upper and lower slots 312 and 314, respectively, which provide lateral adjustability of the base plates 302 with respect to the mounting bracket 190. Upper and lower side apertures 332 and 334, respectively, extend through the base plates 302 at each of the lateral sides thereof. One or more plates 305, 315 are adjustably or movably attached to the base plates 302. Each of the plates 305 and 315 has elongate, horizontal, upper and lower slots 352 and 354 which are registered with the upper and lower side apertures 332 and 334, which permits adjustment of the plates 305, 315, with respect to the underlying base plate 302. Accordingly, like blade assembly 200, blade assembly 300 is adjustable, which permits its use with various different disk blades 50.

The general use of cushion standard shield system 20 is described here with respect to blade assembly 200. However, such use steps are equally applicable to the alternative embodiments of blade assembly 300, and/or others. If the cushion standard shield system 20 was not previously installed by the manufacturer, the user aligns mounting bracket 190 with the cushion standard 45 so that the horizontal leg portion 192 sits upon the planar bottom portion 47 of the standard 45. The user then inserts fasteners 193 through apertures 194, and secures the fasteners, threadedly or otherwise, to the bearing assemblies 160.

Next, the user determines which of the plate members 205, 215 will lie against the mounting bracket 190 and which will be the outermost plate member. In accordance with that decision, respective upper slots 212, 222 are aligned with each other, as are respective lower slots 214, 224. The aligned pairs of slots 212, 222 and 214, 224 are registered with the apertures 199 through the bracket upright 195.

The appropriate width of the blade assembly can be established using the alignment notches 210, 220. Predetermined suitable widths, suitable for various implements 25, are established by, e.g., aligning or otherwise orienting the notches 210, 220 with each other, optionally with other indicia on a portion of the plate members 205, 215, themselves. Fasteners 198 are then inserted through the slots and apertures and secured, which fixes the blade assembly 200 while provide adequate clearance between it and the disk blades 50. Suitable clearance between blade assembly 200 includes, e.g., 0.2 inch or less, 0.5 inch or less, or others.

At that point the user can, as desired, further adjust the blade assembly 200, laterally and/or vertically, to suitably interface with the neighboring disk blades 50. For example, on relatively old or worn disk gangs 40, the user may use the predetermined widths established by the alignment notches 210, 220 as guides, then adjust the blade assembly 200 to provide the desired clearance between the blade assembly 200 and the disk blades 50 (FIG. 6). Consequently, when used with disk blades 50 that, during use, exhibit greater than typical lateral runout, or axial float, the user can setup the cushion standard shield system 20 with relatively more clearance between the blade assembly 200 and the disk blades 50, to prevent non-desired interference between the components.

During use, since the cushion standard shield systems 20 are fixedly mounted, through the bearing assemblies 160, to the axle 55, as the cushion standards 45 flex in correspondence with the particular use environment and use imposed forces, the cushion standard shield system travels in unison with the disk gang 40. In other words, the cushion standard shield systems 20 remain suitably aligned with respect to disk gang 40, despite the vertical flexing, lateral flexing, and impact absorbing, of the cushion standards in association with travel of the disk gang 40 over rough terrain of the field. In particular, the blade assemblies 200, 300 remain in suitable interfacing relationships with the disk blades 50, thus preventing or mitigating the accumulation of dirt or debris at or upon the cushion standards 45.

While the invention has been shown and described with respect to particular embodiments, it is understood that alternatives and modifications are possible and are contemplated as being within the scope of the present invention. For example, a wide variety of ground-engaging implements (e.g., conventional disk harrows) can employ the cushion standard shield system 20 of the present invention. In addition, it should be understood that the number of cushion standard shield systems 20 employed on the implement 25 is not limiting on the invention. It is further understood that the number of plate members 205, 215, within the blade assembly 200 is not limiting, whereby the blade assembly 200 can have a single plate member, or any number of multiple plate members, depending on the intended end use of the cushion standard shield system 20.

Many changes and modifications could be made to the invention without departing from the spirit thereof. The scope of these changes will become apparent from the appended claims.

We claim:

1. A cushion standard shield system for use with a cushion standard of a disk harrow, the disk harrow including first and second laterally spaced disk blades carried by an axle extending along a first axis, each of the first and second disk blades having opposing concave and convex surfaces, comprising:
a mounting bracket having an elongated, planar, horizontal leg portion with a lower surface and an upright bracket extending upwardly from said horizontal portion; said attached to a lower portion of the cushion standard;
a blade assembly having a first plate member and a second plate member:
said first plate member having upper slots aligned with lower slots attached to the mounting bracket and extending between the first disk blade and the second disk blade, the first plate member has a concave lateral edge and a convex lateral edge; and
said second plate member having upper slots aligned with lower slots operatively connected to the first plate member and extending between the first disk blade and the second disk blade, the second plate member has a concave lateral edge and a convex lateral edge;
a bearing assembly having an upper horizontal flange wherein said lower surface of horizontal leg portion interfaces with said upper horizontal flange of said bearing assembly;
said upright bracket includes vertically oriented elongated slots wherein the blade assembly slideably moves upwardly from or downwardly toward the horizontal leg portion of said mounting bracket;
wherein:
the convex lateral edge of the first plate member is proximate the concave surface of the first disk blade, and the concave lateral edge of the second plate member is proximate the convex surface of the second disk blade;

the first and second plate members are movable along a second axis generally parallel to the first axis for adjusting positions of the first and second plate members with respect to the first and second disk blades;

wherein first and second plate members form a shield to block soil residue completely from approaching said cushion standard; and said shield is behind said axle and angled rearwardly approximately 15-25° from a vertical plane from said disk harrow.

2. The cushion standard shield system as in claim 1, wherein the cushion standard has a generally horizontal segment which lies between the mounting bracket and the axle.

3. The cushion standard shield system as in claim 1, wherein each of the plate members being adjustable by way of the elongate slot.

4. The cushion standard shield system as in claim 1, wherein at least one of the plate members has a notch extending into a perimeter edge thereof.

5. The cushion standard shield system as in claim 1, wherein the plate members are substantially of the same perimeter shape.

6. The cushion standard shield system as in claim 1, wherein the plate members are substantially of the same size and configuration.

7. The cushion standard shield system as in claim 1, wherein the distance between the convex lateral edge of the first plate member and the concave surface of the first disk blade defines a clearance of about 0.2 inch or less.

8. The cushion standard shield system as in claim 1, wherein the distance between the concave lateral edge of the second plate member and the convex surface of the second disk blade defines a clearance of about 0.2 inch or less.

9. The cushion standard shield system as in claim 1, wherein each of the first and second plate members is laterally adjustable with respect to the mounting bracket.

10. The cushion standard shield system as in claim 1, wherein the concave and convex lateral edges of the first and second plate members have generally the same radii.

* * * * *